(12) United States Patent
Stahl et al.

(10) Patent No.: US 7,461,097 B2
(45) Date of Patent: Dec. 2, 2008

(54) METHOD, SYSTEM, AND COMPUTER PROGRAM FOR MIGRATING CONTENT FROM SOURCE DATABASE TO TARGET DATABASE

(75) Inventors: Martin Stahl, Schwetzingen (DE); Bernd Kohler, Mannheim (DE); Guenter Briam, Wiesloch (DE); Torsten Ziegler, Dielheim (DE); Frank-Martin Haas, Dielheim (DE)

(73) Assignee: SAP Aktiengesellschaft, Walldorf ( * ) Notice: Subject to any disclaimer, the term of this patent is extended or adjusted under 35 U.S.C. 154(b) by 605 days.

(21) Appl. No.: 10/714,557

(22) Filed: Nov. 14, 2003

(65) Prior Publication Data
US 2004/0122865 A1 Jun. 24, 2004

Related U.S. Application Data

(63) Continuation of application No. PCT/EP01/06118, filed on May 30, 2001.

(51) Int. Cl.
G06F 17/30 (2006.01)
(52) U.S. Cl. .................................. 707/201; 707/10
(58) Field of Classification Search ............... 707/10, 707/201
See application file for complete search history.

(56) References Cited

U.S. PATENT DOCUMENTS

| | | | | |
|---|---|---|---|---|
| 5,390,335 | A * | 2/1995 | Stephan et al. | 709/221 |
| 5,617,425 | A * | 4/1997 | Anderson | 714/710 |
| 5,784,069 | A | 7/1998 | Daniels et al. | |
| 5,893,119 | A | 4/1999 | Squibb | |
| 6,006,216 | A * | 12/1999 | Griffin et al. | 707/2 |
| 6,094,684 | A | 7/2000 | Pallmann | |
| 6,119,117 | A * | 9/2000 | Yoda et al. | 707/2 |
| 6,122,630 | A | 9/2000 | Strickler et al. | |
| 6,141,664 | A | 10/2000 | Boothby | |
| 6,167,405 | A | 12/2000 | Rosensteel, Jr. et al. | |
| 6,205,451 | B1 | 3/2001 | Norcott et al. | |
| 6,484,309 | B2 * | 11/2002 | Nowlin et al. | 717/100 |
| 2002/0116356 | A1 * | 8/2002 | Ieong et al. | 707/1 |

OTHER PUBLICATIONS

Elke Radeke, Marc H. Scholl, "*Functionality for Object Migration Among Distributed Heterogeneous, Autonomous DBS*", 1995, IEEE pp. 58-66.

International Search Report, International Application No. PCT/EP01/06118.

(Continued)

*Primary Examiner*—Srirama Channavajjala
(74) *Attorney, Agent, or Firm*—Fish & Richardson P.C.

(57) ABSTRACT

In a software system (200/210/220) with a business application (200), database migration from a source database (210) to a physically different target database (230) is performed by a migration tool (260) that evaluates database instructions (201) that the application (200) consecutively sends to the source database (210). The migration tool (260) stores representations (254, 255) of an action type (205, D, I, U) and of a key (231) in a log table (250) when an action type coincides with a predetermined action type (D, I, U); copies source table entries to the target table (240); and adjusts entries in the target table that have keys represented in the log table (250). During migration, the application (200) and the source table continue communicating.

17 Claims, 9 Drawing Sheets

OTHER PUBLICATIONS

Office Action, Communication Pursuant to Article 96(2) EPC, European Patent Office, Application No. 01 951 529.5 - 2201, dated Feb. 3, 2005, 3 pages.

Office Action, Communication Pursuant to Article 96(2) EPC, European Patent Office, Application No. 01 951 529.5 - 2201, dated Mar. 26, 2004, 4 pages.

* cited by examiner

|   | SEND TO SOURCE 405 | STORE IN LOG 410 | COPY TO TARGET 420 | ADJUST 430 |
|---|---|---|---|---|
| 1 | INSERT (1) abc | | | |
| 2 | INSERT (2) def | | | |
| 3 | | START | | |
| 4 | INSERT (3) ghi | (3) I | | |
| STATUS IN FIG. 5 | | | | |
| 5 | READ (1) | | | |
| 6 | UPDATE (1) bac | (1) U | | |
| 7 | INSERT (4) jkl | (4) I | | |
| 8 | | | START | |
| 9 | | (1) C | (1) bac | |
| STATUS IN FIG. 6 | | | | |
| 10 | | | (2) def | |
| 11 | UPDATE (2) fed | (2) U | | |
| 12 | | (3) C | (3) ghi | |
| 13 | | | STOP | |
| 14 | INSERT (5) mno | (5) I | | |
| 15 | UPDATE (1) cab | (1) U | | |
| STATUS IN FIG. 7 | | | | |
| 16 | | | | START |
| 17 | | (4) C | | (4) jkl |
| 18 | | (2) C | | (2) fed |
| 19 | | (5) C | | (5) mno |
| 20 | INSERT (6) pqr | (6) I | | |
| 21 | STOP | STOP | | |
| 22 | | (6) C | | (6) pqr |
| 23 | | (1) C | | (1) cab |
| 24 | | | | STOP |
| STATUS IN FIG. 8 | | | | |

FIG. 4

| SOURCE 230 | | TARGET 240 | | LOG 250 | |
|---|---|---|---|---|---|
| KEY 231 | CONTENT 232 | KEY 241 | CONTENT 242 | KEY 251 | ACTION 255 |
| (1) | abc | - | - | (3) | I |
| (2) | def | - | - | - | - |
| (3) | ghi | - | - | - | - |

FIG. 5

| SOURCE 230 | | TARGET 240 | | LOG 250 | |
|---|---|---|---|---|---|
| KEY 231 | CONTENT 232 | KEY 241 | CONTENT 242 | KEY 251 | ACTION 255 |
| (1) | bac | (1) | bac | (1) | C |
| (2) | def | | | (3) | I |
| (3) | ghi | | | (4) | I |
| (4) | jkl | | | | |

FIG. 6

| SOURCE 230 | | TARGET 240 | | LOG 250 | |
|---|---|---|---|---|---|
| KEY 231 | CONTENT 232 | KEY 241 | CONTENT 242 | KEY 251 | ACTION 255 |
| (1) | cab | (1) | bac | (1) | U |
| (2) | fed | (2) | def | (3) | C |
| (3) | ghi | (3) | ghi | (4) | I |
| (4) | jkl | | | (2) | U |
| (5) | mno | | | (5) | I |

FIG. 7

| SOURCE 230 | | TARGET 240 | | LOG 250 | |
| --- | --- | --- | --- | --- | --- |
| KEY 231 | CONTENT 232 | KEY 241 | CONTENT 242 | KEY 251 | ACTION 255 |
| (1) | cab | (1) | cab | (1) | C |
| (2) | fed | (2) | fed | (2) | C |
| (3) | ghi | (3) | ghi | (3) | C |
| (4) | jkl | (4) | jkl | (4) | C |
| (5) | mno | (5) | mno | (5) | C |
| (6) | pqr | (6) | pqr | (6) | C |

FIG. 8

METHOD, SYSTEM, AND COMPUTER PROGRAM FOR MIGRATING CONTENT FROM SOURCE DATABASE TO TARGET DATABASE

CROSS-REFERENCE TO RELATED APPLICATIONS

Under 35 U.S.C. § 120, this application is a continuation application of international application number PCT/EP01/06118 filed on May 30, 2001, and designating the U.S.

FIELD OF THE INVENTION

The present invention generally relates to computers that implement database systems, and more particularly, relates to method, system and program for migrating data from a first database system to a second database system.

BACKGROUND OF THE INVENTION

In the business software industry, 3-tier-solutions are convenient. Usually, such solutions comprise user-interface systems in a first layer, business application systems in a second layer, and database systems in a third layer ("system" hereinafter left out). Examples for 3-tier-solutions are the well-known software solutions, such as the R/3 and mySAP.com solution that are commercially available from SAP Aktiengesellschaft, Walldorf (Baden), Germany. For the following discussion, the second and third layers deserve closer attention.

The databases are usually implemented as relational databases that communicate with the applications by predefined and. standardized statements, such as System Query Language (SQL) statements.

Relational databases are well known in the art, information is structured in tables, or relations, in which data values are stored in rows, or tuples, under various column headings.

Technological processes, changing customer demands and other circumstances generate demand to migrate data to other databases. Usually, migrating requires time in that the application does not operate as required.

To copy database and/or applications to another location is possible in a short amount of time as long as the structure of the data remains unchanged. Data restructuring requires more time.

However, the acceptance of a business application depends, among other things, on its availability. Customers that appreciate the database services of a patent office do not worry about non-availability during night hours. But there are many other systems that do allow non-availability, as a practical matter, only during certain times of a year, such as during certain holidays. In other words, many business application systems should ideally be available 24 hours a day, 365 days a year.

From a relational database, information is retrieved by a query. When information is to be updated, inserted or deleted from the database by a so-called transaction, at least one table needs to be modified. There are several approaches to deal with database maintenance.

For the discussion of prior art systems, the following references are useful: U.S. Pat. No. 6,141,664; U.S. Pat. No. 6,122,630; U.S. Pat. No. 6,205,451; U.S. Pat. No. 5,893,119; and U.S. Pat. No. 6,006,216.

In any case, there is a technical task to reduce the so-called system downtime during updating the system.

SUMMARY OF THE INVENTION

In one general aspect, the present invention relates to a method for migrating content from a source table in a source database to a target table in a target database, wherein the databases are physically different. Before migrating, a business application consecutively sends database instructions to the source database; after migrating, the business application consecutively sends the database instructions to the target database. In either table, each entry has a unique key. The database instructions have predetermined action types. The method includes storing representations of the action type and of the key in a log table under the condition that the action type coincides with a predetermined action type; copying entries of the source table to the target table; and adjusting the entries in the target table that have keys represented in the log table, according to the action type representation stored in the log table.

Adjusting at least partially takes place when the application is still in communication with the source database. Sending instructions to the source database is still possible even when copying is completed. The downtime for the application is reduced.

In some implementations, copying entries may involve converting the coding of the entry from a single-byte code such as ASCII to a multi-byte code such as unicode. By using a key that is valid both in the source database and in the target database, converting may be performed during database migration.

In some implementations, adjusting is performed in a first adjustment period while the application is still sending database instructions, and in a second adjustment period while the application is silent. The second period may be shorter than the first period.

In some implementations, the predetermined action types may be selected from among insert, delete, and update, and the instructions may be SQL statements. These techniques are compatible with existing database systems.

In some implementations, adjusting may involve adjusting a first portion of the source table with a first portion of the target table substantially in parallel with adjusting a second portion of the source table with a second portion of the target table. As long as separate portions are assigned to separate adjustment processes, parallel processing further reduces the application down-time.

In some implementations, copying entries may involve copying a first portion of the source table to a first portion of the target table substantially in parallel with copying a second portion of the source table to a second portion of the target table. As long as separate portions are assigned to separate copy processes, parallel processing further reduces the overall migration time.

In another general aspect, an article of manufacture may comprise a computer readable medium having computer readable program code embodied therein for executing the method described above.

In another general aspect, the present invention relates to a computer program product for migrating content from a source table in a source database to a target table in a target database, wherein the databases are physically different. Prior to migrating, a business application consecutively sends database instructions to the source database, and after migrating, the business application consecutively sends the database instructions to the target database. In either table each entry has a unique key, and the database instructions have action types. The computer program product has instructions that cause a processor to store representations of the action type and of the key in a log table under the condition that the action type coincides with a predetermined action type; copy entries of the source table to the target table, wherein the coding of the entry is converted; and adjust the entries in the target table that have keys represented in the log table, according to the action type representation stored in the log table.

In some implementations, the instructions cause the processor to perform adjusting consecutively in a first adjustment period while the application is sending database instructions, and in a second adjustment period while the application is silent.

In some implementations, the instructions cause the processor to perform the adjusting step by adjusting a first portion of the source table with a first portion of the target table substantially in parallel to adjusting a second portion of the source table with a second portion of the target table.

In yet another general aspect, the present invention relates to a computer system for migrating content from a source table in a source database to a target table in a target database, wherein the databases are physically different. Prior to migrating, a business application consecutively sends database instructions to the source database, and after migrating, the business application consecutively sends the database instructions to the target database. In either table each entry has a unique key, and the database instructions have action types. The computer system includes a migration tool implemented by a computer program running on a processor. The migration tool may include means for storing representations of the action type and of the key in a log table under the condition that the action type coincides with a predetermined action type; means for copying entries of the source table to the target table, wherein the coding of the entry is converted; and means for adjusting these entries in the target table that have keys represented in the log table, according to the action type representation stored in the log table.

BRIEF DESCRIPTION OF THE DRAWINGS

FIG. 4 illustrates an overview of method step actions that take place at consecutive time points;

FIGS. 5-8 illustrate database tables at different time points; and

DETAILED DESCRIPTION

Figure 1:
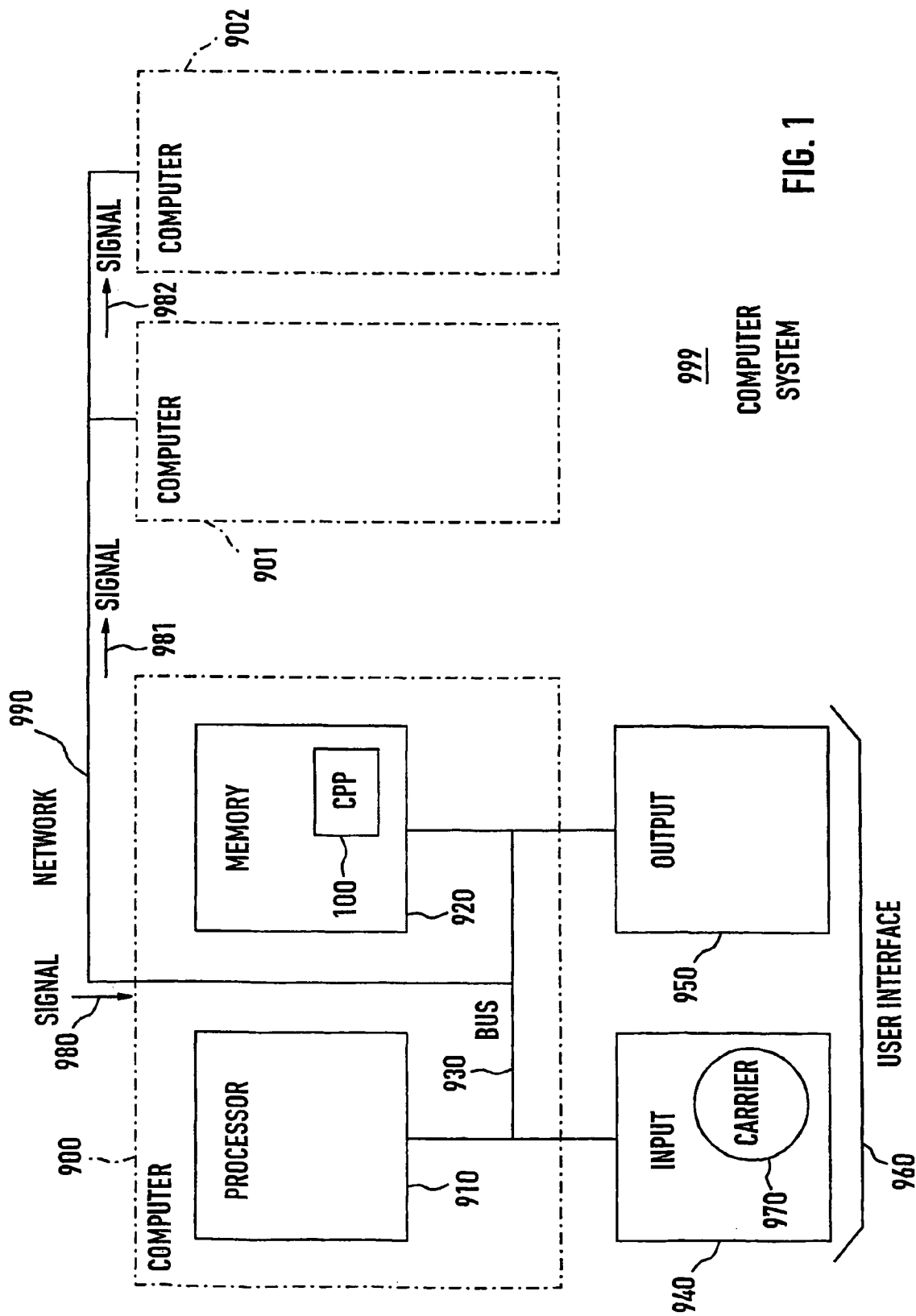
FIG. 1 illustrates a simplified block diagram of the inventive computer network system having a plurality of computers.

FIG. 1 illustrates a simplified block diagram of a computer network system 999 having a plurality of computers 900, 901, 902 (or 90q, with q=0 . . . Q−1, where Q=any number).

Computers 900-902 are coupled via inter-computer network 990. Computer 900 comprises processor 910, memory 920, bus 930, and, optionally, input device 940 and output device 950 (I/O devices, user interface 960). As illustrated, the system 999 includes a computer program product 100 (CPP), a program carrier 970 and a program signal 980, collectively "program".

With respect to computer 900, computer 901/902 is sometimes referred to as "remote computer". Computer 901/902 is, for example, a server, a router, a peer device or other common network node and typically includes many or all of the elements described relative to computer 900. Hence, elements 100 and 910-980 in computer 900 collectively illustrate components for which corresponding elements 10q and 91q-98q (shown for q=0) may be included in computers 90q.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 may be physically implemented by computer-readable media, such as, computer-readable storage media for example: (a) magnetic media, like a hard disk, a floppy disk, or other magnetic disk, a tape, a cassette tape; (b) optical media, such as an optical disk (CD-ROM, digital versatile disk—DVD); (c) semiconductor media, like DRAM, SRAM, EPROM, EEPROM, memory stick) or by any other media, such as paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained in more detail below. In other words, CPP 100 defines the operation of computer 900 and its interaction in the computer network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 may be a keyboard, a pointing device (e.g., mouse, trackball, cursor direction keys), microphone, joystick, game pad, or scanner. Although the examples are devices with human interaction, device 940 can also operate without human interaction, such as a wireless receiver (e.g., with satellite dish or terrestrial antenna), a sensor (e.g., a thermometer), or a counter (e.g., goods counter in a factory). Input device 940 can serve to read carrier 970.

Output device 950 symbolizes a device that presents instructions and data that have been processed. For example, the output device 950 may include a monitor or other type of display, (cathode ray tube (CRT), flat panel display, liquid crystal display (LCD), a speaker, a printer, a plotter, or a vibration alert device. Similar as above, output device 950 communicates with the user, but it can also communicate with further computers.

Input device 940 and output device 950 can be combined in to a single device, and the inclusion of devices 940 and 950 is optional.

Bus 930 and network 990 provide logical and physical connections for conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals on the network 990 may be electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 may be, for example, a local area network (LAN), a wide area network (WAN), a public switched telephone network (PSTN); an Integrated Services Digital Network (ISDN), an infra-red (IR) link, a radio link, such as Universal Mobile Telecommunications System (UMTS), Global System for Mobile Communication (GSM), or Code Division Multiple Access (CDMA), or a satellite link.

Transmission protocols and data formats may include, for example, transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
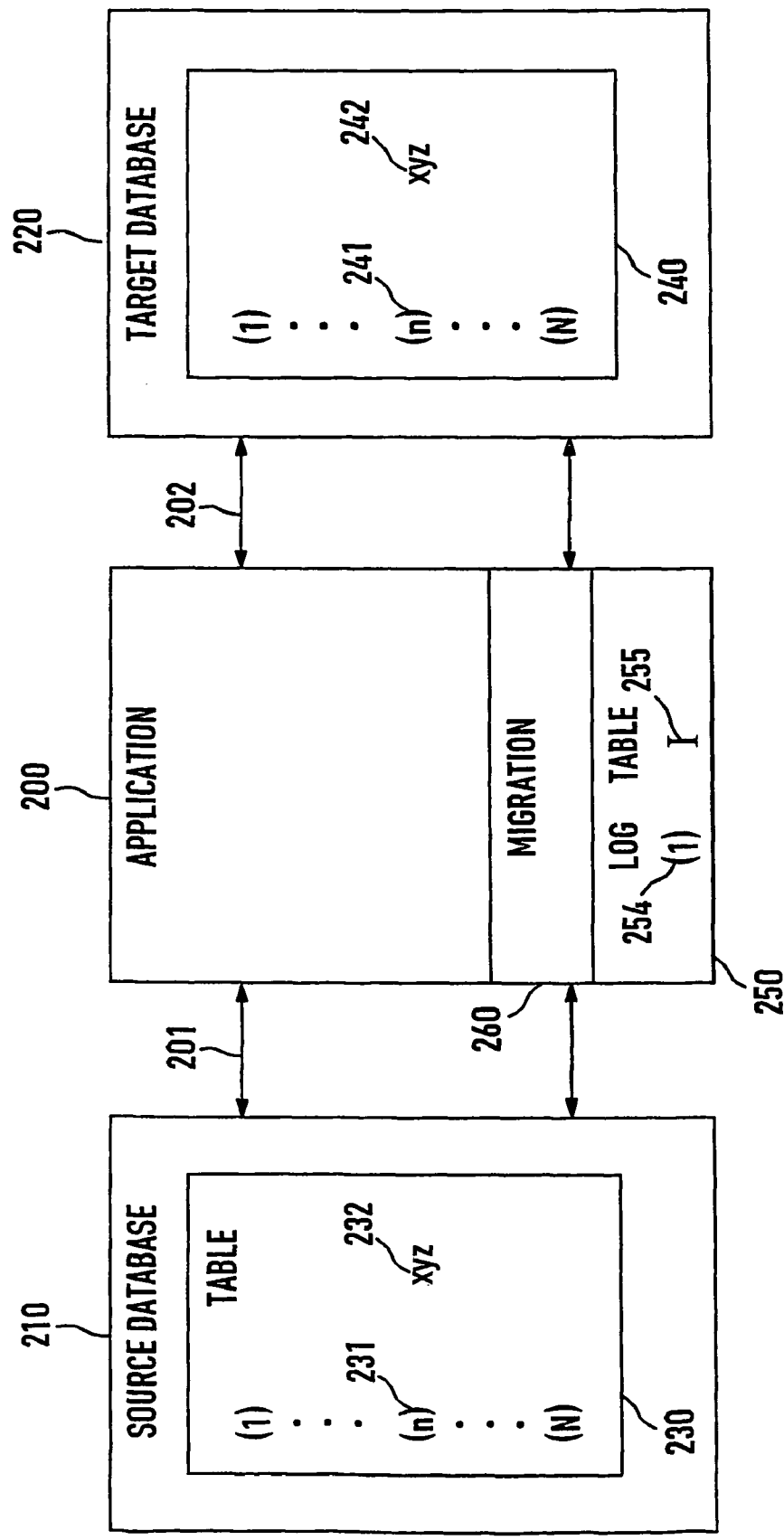
FIG. 2 illustrates a simplified block diagram of an application, a source database, a target database, a log table, and a migration tool.

FIG. 2 illustrates a simplified block diagram of business application 200, source database 210, target database 220, log table 250, and migration tool 260, all being data processing functions using computers. For example, computer 900 implements application 200, log table 250 and migration tool 260; computer 901 implements source database 210; and computer 902 implements target database 230. Optionally, log table 250 is implemented on computer 901 together with source database 210, which implementation is convenient but not required.

Arrows between the boxes illustrate a convenient signal flow. Application 200 sends (cf. steps 405, 406) database instructions (i.e., query statements) to the databases. Application 200 either sends database instructions 201 to database 210, or sends database instructions 202 to database 220. Instructions 201, 202 have action types such as insert (I), delete (D), update (U) or read (R) operations. The arrows are bi-directional: the application 200 receives data as well (e.g., read). Migration tool 260 communicates with log table 250 and databases 210 and 220.

Databases 210 and 220 are physically different. Source database 210 has a source table 230 with a plurality of entries 231/232, wherein each entry 231/232 has key 231 and content 232. Likewise, target database 220 has target table 240 with a plurality of entries 241/242, wherein each entry 241/242 has key 241 and content 242. As used herein, content refers to the information that is stored in the entries, such as alphanumerical information; the keys are objects to logically identify content. In both tables 230 and 240, keys 231 and 241 are further identified by numbers in parenthesis (1), (2), (n) . . . (N). Also, in both tables 230 and 240, exemplary content 232, 242 is abbreviated by lowercase letter triples, such as "abc", "def", the letters in any order.

Since (as mentioned) the databases are different, the form in which each database stores content can be different as well. For example, database 210 may use single-byte coding and database 220 may use double-byte coding. For example, database 210 stores content "abc"—a string of 3 characters-by 3 ASCII-bytes. The key (1) identifies the physical address (1)+0 for byte 1, address (1)+1 for byte 2 and (1)+2 for byte 3. In the example, database 220 store same content by 3 unicode-double-bytes. The key (1) identifies the physical address (1)+0 for byte 1, (1)+1 for byte 2, and so on to address (1)+5 for byte 6. Rules to derive the address from the key are well known in the art and therefore not further explained. Although conveniently explained by double-byte coding, persons of skill in the art generally can use multi-byte coding as well (e.g., unicode with up to 6 bytes).

Migration tool 260 comprises program instructions to execute a method for migrating content 232 from source table 230 in source database 210 to target table 240 in target database 220 according to the present invention. Log table 250 stores intermediate data such as key representation 255 and action type representation.

Figure 3:
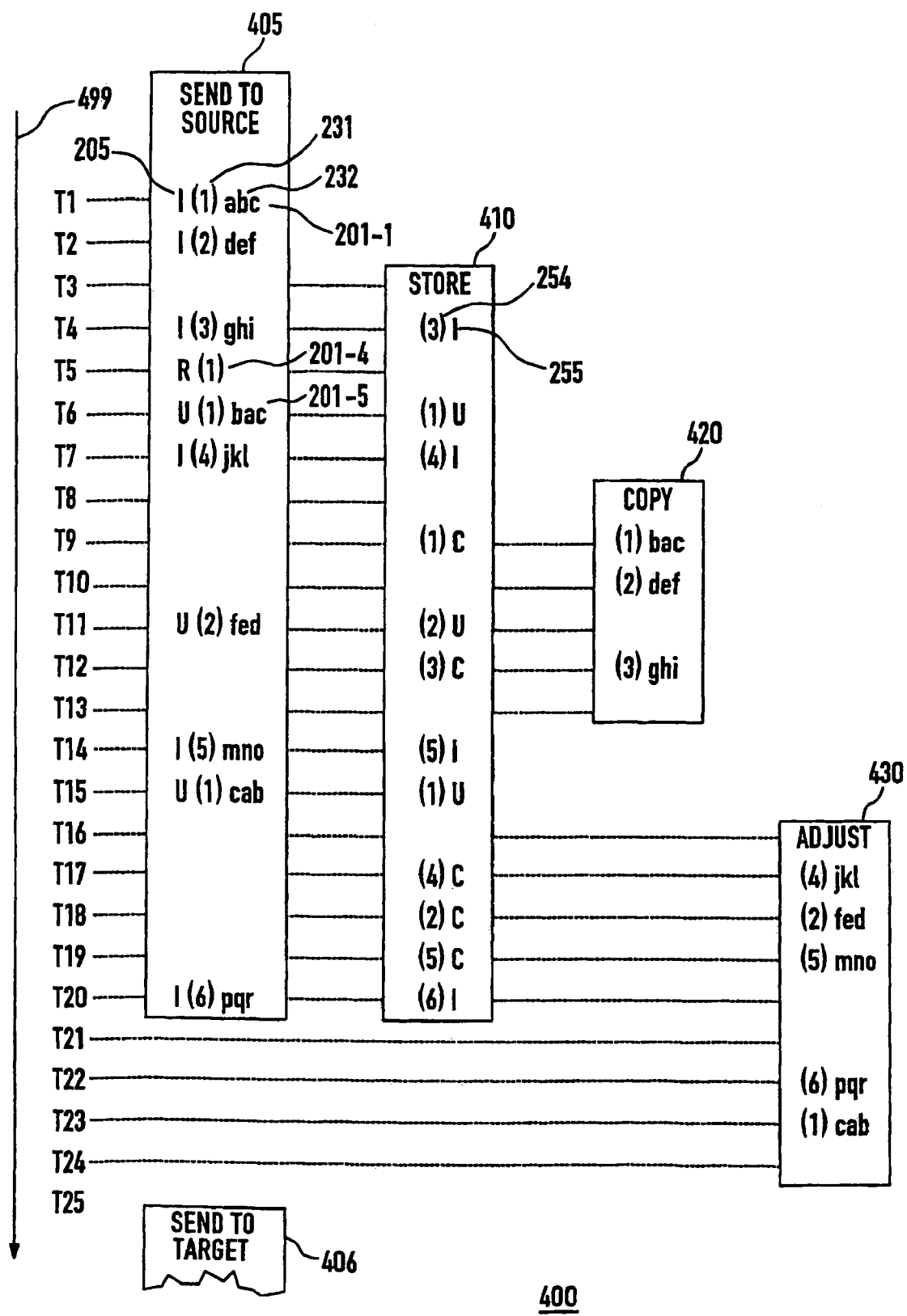
FIG. 3 illustrates a method of the present invention by a simplified flowchart diagram in combination with a time axis.

FIG. 3 illustrates a simplified flowchart diagram of method 400 in combination with a time axis 499. Boxes illustrate method steps 405, 410, 420 and 430. FIG. 3 also illustrates a step 406 that follows method 400. Axis 499 indicates time points T1 to T25. Although the illustration shows time intervals of equal duration, the time intervals are not important for the present invention and may vary. Horizontal grid lines from axis 499 to the step boxes indicate that some sub-steps are substantially performed simultaneously. For example, sub-step I(3)ghi in step 405 coincides with sub-step (3)I in step 410. Optionally, further steps are performed in parallel.

The method 400 for migrating content 232 (cf. FIG. 2) from source table 230 in source database 210 to target table 240 in target database 220 (databases 210, 220 being physically different) starts when business application 200 consecutively sends (step 405) database instructions 201 to source database 210 (i.e. before migrating). When method 400 has ended, business application 200 consecutively sends (step 406) database instructions 202 to target database 220, (i.e. after migrating). In either table 230, 240, each entry 231/232, 241/242 has unique key 231, 241; database instructions 201, 202 have action types 205 (for example D, I, R, U). Method 400 comprises the following steps:

storing 410 representations 254, 255 of action type 205 (D, I, U) and of key 231 in log table 250 under the condition that the action type coincides with a predetermined action type (D, I, U);

copying 420 entries 231/232 of source table 230 to target table 240 (entries 241/242); and adjusting 430 these entries in target table 240 that have keys represented in log table 250, according to action type representation 255 stored in log table 250.

Preferably, the step of copying 420 includes converting the coding of entry 231/232, for example from a single-byte code (e.g., ASCII) to a double-byte code (e.g., unicode).

Preferably, adjusting step 420 is performed in a first adjustment period (T16 to T20) while application 200 is sending database instructions 201, and in a second adjustment period (T21 to T24) while application 200 is silent.

Preferably, the predetermined action types are selected from the group of insert (I), delete (D), and update (U). Preferably, database instructions 201, 202 are SQL statements.

Optionally, adjusting step 430 comprises adjusting a first portion of source table 230 with a first portion of target table 240 substantially in parallel with adjusting a second portion of source table 240 with a second portion of the target table. Similarly, copying step 420 can involve copying a first portion of source table 230 to a first portion of target table 240 substantially in parallel with copying a second portion of source table 230 to a second portion of the target table. Details are given in connection with FIG. 9.

The method steps are now explained with more detail. Step 405 (sending database instructions) can start at any time prior to T1. Application 200 sends statements 201 to source database 210 at consecutive time points Ti. For convenience, statements 201 are illustrated with action type 205, key 231, and content 232. For example, statement 201-1 has action type "I", content "abc", and key (1). "D" abbreviates "delete" for removing key 231 and content 232 (not illustrated in FIG. 3). "I" abbreviates "insert" for creating a new entry with key 231 and content 232 to table 230, as for example statement 201-1 to write "abc" to key (1). "R" abbreviates "read" for returning content to application 200; for example, statement 201-4 returns content "abc" at key (1). "U" abbreviates "update" for modifying content 232 at a given key without creating a new key; for example writing "bac" at key 1 by statement 201-5. Step 405 may stop at a late time point, after the step of copying 420 is finished. One potential advantage of the present invention is that application 200 still can operate with database 210 and table 230.

Step 410 (storing in log table) can start at any time. If the action type of instruction 201 coincides with one of a predetermined group of action types, then key representation 254 and action type representation 255 are stored in log table 250. Otherwise, log table 250 remains unchanged. Conveniently, the group of action types is "D", "I", and "U". For convenience of explanation, action type 205 (from application 200) is identical to action type representation 254 (to log table 250), and key 231 (from application 200) is identical to key representation 255 (to log table 250). Using log table 250 has the advantage that any modification of D, I or U type to table 230 can be traced even if database 210 fails to operate. If, for a particular key, log table 250 already stores an action type representation, then migration tool 260 replaces the old representation by the new one.

Step 420 (copying to target) copies everything that is in source table 230. Optionally, log table 250 is considered and entries 231/232 that have been copied are marked. In the example of FIG. 3, action type representations "D", "I", or "U" are replaced by a different representation, such as "C". Optionally, a time stamp can be added to log table 250. In other words, the availability of entries from log table 250 is removed when entries have been saved to target table 240 (in connection with steps 420 and 430). As persons of skill in the art understand, removing the availability of entries can also involve deleting the entry. This avoids an erroneous repetition of copy step 420. This is important for maintaining data consistency in case of adjusting in parallel, and for allowing the whole process to start again. It does not matter whether an entry has been copied to target table 240 but is later modified (D, I or U) in source table 230. For example, content "bac" at key (1) of source table 230 is copied to key (1) at target table 240 but later updated at the same key (1) in source table 230 to "cab" that is finally copied to target table 240 in the step of adjusting 430. Step 420 can stop on request of a database administrator. There is no need to copy everything from source table 230; for example, at stop time T13, source table 230 comprises an entry at key (4) that is not yet copied.

Preferably, step 430 (adjusting) involves replacing the action type representation by a different representation (e.g., "C") as in step 420. Step 430 (adjusting) is, preferably, performed in two phases. In the first phase, step 410 (storing log table) is still active, for example, until T21. In the second phase, step 410 is already disabled; entries are copied from source table 230 to target table 240 directly (e.g., "pqr" at key (6)).

If log table 250 shows action type representations "U" or "I", then step 430 comprises copying from source table 230 to target table 240; if log table 250 shows action type representation "D", then the corresponding entry in target table 240 is deleted (or the nonexistence of the entry in table 240 is verified).

FIGS. 4-8 illustrate an overview of method step actions that take place at consecutive time points in an example. The left column corresponds to axis 499 in FIG. 3. Column 405 lists instructions 201 that application 200 sends (step 405) to source table until sending stops at T21; column 410 lists key and type representations written into log table 250 in step 410 as well as lists "C" to remove representations (steps 420, 430); columns 420 and 430 indicate keys 241 and content 242 written into target table 240 during steps 420 and 430. Conveniently, FIG. 4 refers to FIGS. 5-8 that illustrate the status of tables 220, 240 and 250 at different time points.

Referring back to FIGS. 4-8, the example is explained for each time point. Reference numbers are sometimes left out for convenience. Before and after time point T1, application 200 is sending database instructions 201 to source table 230 in source database 210 (step 405). For convenience of explanation, target table 240 in target database 220 and log table 250 are initially (at T1) assumed to be empty.

At time point T1, the application sends (step 405) instruction 201-1 "I(1)abc" to the source database that inserts (action type 205 "I") content 232 "abc" into the source table at key 231 (1).

At time point T2, the application sends instruction "I(2) def" to the source database that inserts content "def" into the source table at key (2). Although illustrated by only two insert actions, step 405 is the normal operation of application 200/ database 210 and is performed over a long time period with thousands of instructions.

At time point T3, storing step 410 starts (storing representations of action type and key). T3 is, preferably, at the discretion of the database administrator. Since storing step 410 does not influence how the application communicates with the source database, the storing step can start at any time.

At time point T4, the application sends instruction "I(3) ghi" to the source database that inserts content "ghi" into the source table at key (3). Since the action type "I" is one the predetermined types "D", "I" and "U", action type representation 255 "I" and key representation (3) are stored (step 410) in log table 250. The tables are now in the state that is illustrated in FIG. 5.

At time point T5, the application sends instruction "R(1)" to the source database that returns content "abc" without altering the source table. Since the action type "R" does not belong to one of the predetermined types, log table 250 remains unchanged.

At time point T6, the application sends instruction "U(1) bac" to the source database that modifies the content in the source table at key (1) to "bac". Since the action type "U" is one of the predetermined types, action type representation "U" and key representation (1) are stored in the log table.

At time point T7, the application sends instruction "I(4) "jkl" to the source database that inserts the content "jkl" to the source table at key (4). Since the action type "I" belongs to one of the predetermined types, representations "I" and (4) are stored in the log table.

At time point T8, copying step 420 starts. T8, is preferably, at the discretion of the database administrator, but can start at substantially any time.

At time point T9, migration tool 260 copies the content "bac" at key (1) from the source table to target table 240. In the log table, the representation "U" for the key (1) is modified to "C". Modifying log table 250 by copying step 420 is optional. It is also possible to keep log table (with (3)I) unchanged to copy "ghi" to the target table during adjusting. The tables are now in the state that is illustrated in FIG. 6.

At time point T10, the migration tool copies content "def" at key (2) from the source table to the target table.

At time point T11, the application sends the instruction "U(2)fed" to the source database that modifies the content of the source table at key (2). Since the action type "U" is one of the predetermined types, representations "U" and (2) are stored (step 410) in the log table. So far, the target table with the old content "def" at key (2) remains unchanged.

At time point T12, the migration tool copies the content "ghi" at key (3) to the target table; also, the migration tool modifies the log table by replacing "I" by "C" for the key (3).

At time point T13, the step of copying 420 stops. Preferably, T13 is at the discretion of the database administrator, but automation can also be used. Conveniently, time points T8 and T13 for the step of copying 420 are chosen for a period where the application sends only a few instructions to the source database, such as during the weekend. One potential advantage of the present invention is that application-to-database interactions may be allowed without any restrictions (cf. T11).

At time point T14, the application sends the instruction "I(5)mno" to the source database that inserts the content "mno" at key (5). Since the action type "I" is one of the predetermined types, representations "I" and (5) are stored in the log table. Now, the situation is such that the application is still communicating with the source database, but copying to the target database (step 420) is already finished.

At time point T15, the application sends the instructions "U(1)cab" to the source database that modifies the content at key (1). Since the action type "U" is one of the predefined action types, representations "U" and (1) are stored in the log table (step 410). In the example, the "C" at key (1) is replaced by "U". The tables are now in the state that is illustrated in FIG. 7.

At time point T16, adjusting step 430 starts.

At time point T17, the migration tool reads representations "I" and (4) from the log table, copies the content "jkl" from the source table at key (4) to the target table at key (4), and replaces "I" by "C" in the log table.

At time point T18, the migration tool reads representations "U" and (2) from the log table, copies the content "fed" from the source table at key (2) to the target table at key (2), and replaces "U" by "C" in the log table.

At time point T19, the migration tool reads representations "I" and (5) from the log table, copies the content "mno" from the source table at key (5) to the target table at key (5), and replaces "I" by "C" in the log table.

At time point T20, the application sends instruction "I(6) pqr" to the source database that inserts content "pqr" into the source table at key (6). Since the actions type "I" is one of the predetermined types, representations "I" and (6) are stored (step 410) in the log table. One potential advantage of the present invention is that while adjusting step 430 is being performed, the application may still be allowed to send instructions to the source database.

At time point T21, both the step of sending 405 and the step of storing 410 stop. Simultaneously stopping both steps is convenient. Because database instructions are not expected from the application any longer, there are no representations "U", "D" or "I" to add in the log table. Time point T21 marks the beginning of a short transition period in that the step of adjusting is finished.

At time point T22, the migration tool reads representations "I" and (6) from the log table, copies the content "pqr" from the source table at key (6) to the target table at key (6), and replaces "I" by "C" in the log table. (not illustrated in FIG. 3)

At time point T23, the migration tool reads representations "U" and (1) from the log table, copies the content "cab" from the source table at key (1) to the target table at key (1), and replaces "U" by "C" in the log table. In the target table, existing "bac" at key (1) is overwritten.

At time point T24, the tables are now in the state that is illustrated in FIG. 8. The migration tool reads that only "C" representations are left in the log table, so the adjusting step stops. Method 400 for migrating content from the source database to the target database is now completed.

From time point T25, the application sends the instructions to the target database (step 406).

Figure 9:
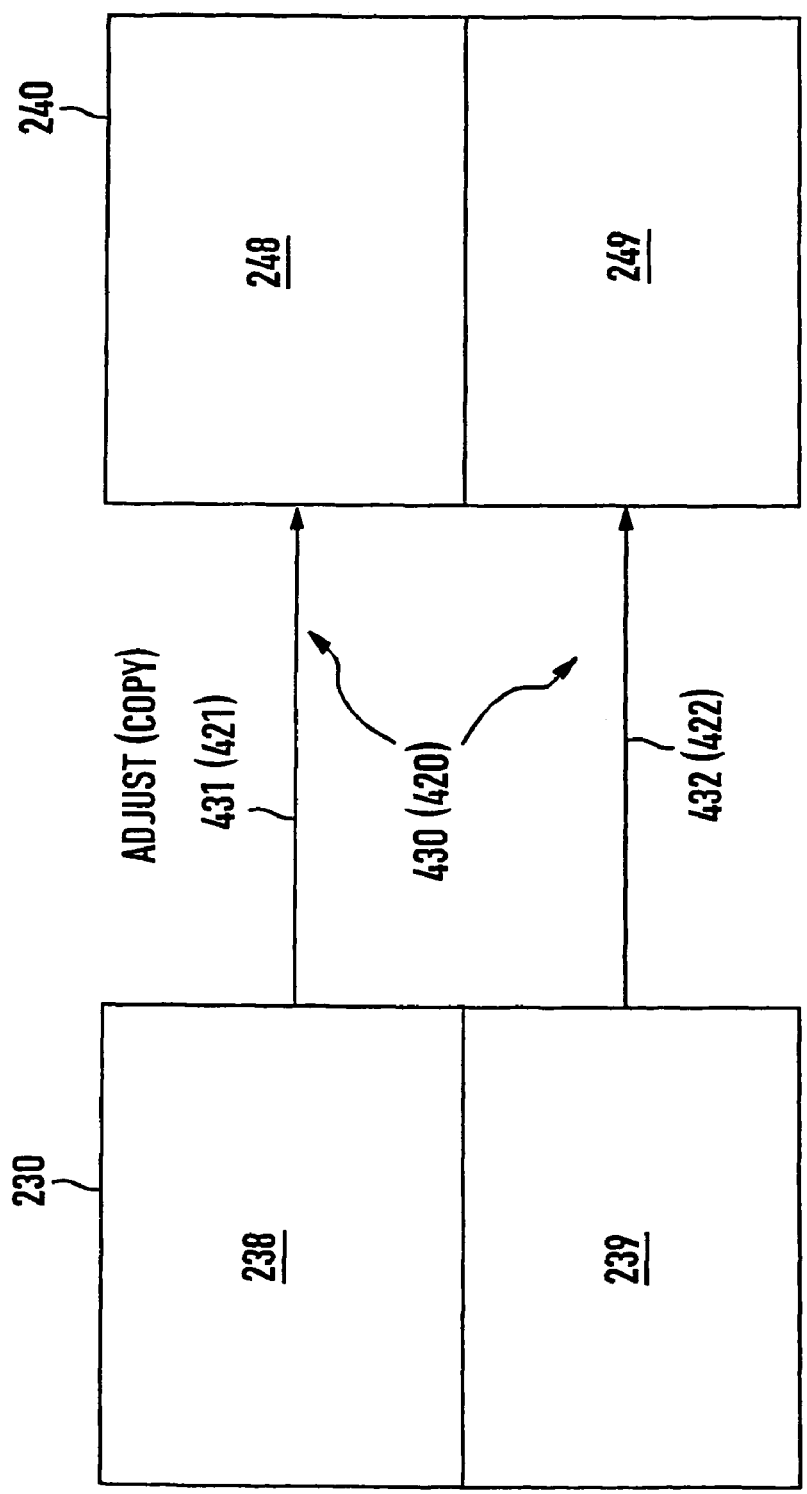
FIG. 9 illustrates a simplified diagram of source and target tables with the adjusting und copying steps in a further embodiment of the present invention.

FIG. 9 illustrates a simplified diagram of source table 230 and target table 240 with the adjusting step 430 in a further embodiment of the present invention. First portion 238 of source table 220 is adjusted (431) with first portion 248 of target table 240 substantially in parallel while second portion 239 of source table 220 is adjusted (432) with second portion 249 of target table 240. Optionally, as indicated by reference numbers 420 (copying), 421 (copy first portion) and 422 (copy second portion), parallel operation is also possible for copying step 420.

Persons of skill in the art can introduce additional steps without departing from the scope of the present invention. For example, exclusive locks can be provided that prevent database 210 from following instruction 201 with "I", "D" or "U" actions to alter source table 230 while migration tool 260 adjusts an entry with the identical key in target table 240. Having migration tool 260 implemented as a separate functional unit is convenient but not required for the present invention. Since migration tool 260 also evaluates instructions 201 (e.g., for providing log table 250), migration tool 260 can be integrated into application 200.

The present invention is summarized as (cf. FIGS. 1-3) computer program product 100 for migrating content 232 from source table 230 in source database 210 to target table 240 in target database 220, wherein databases 210, 220 are physically different. Prior to migrating, business application 200 consecutively sends 405 database instructions 201 (SQL statements) to source database 210, and after migrating, business application 200 consecutively sends 406 database instructions 202 to target database 220. In either table 230, 240, each entry 231/232, 241/242 has a unique key 231, 241; database instructions 201, 202 have action types 205 (D, I, R, U). Computer program product 100 has instructions that cause processor 900 to execute the following steps: storing 410 representations 254, 255 of action type 205 and of key 231 in log table 250 under the condition that action type 205 coincides with a predetermined action type; copying 420 entries 231/232 of source table 220 to target table 240, wherein the coding of the entry is converted (single-byte to multi-byte, ASCII to unicode); and adjusting 430 these entries in the target table that have keys represented in log table, according to the action type representation stored in log table 250.

Preferably, the instructions cause processor 900 to perform adjusting consecutively in a first adjustment period (T16 to T20) while application 200 is sending database instructions 201, and in a second adjustment period (T21 to T24) while application 200 is silent.

Preferably (cf. FIG. 9), the instructions cause processor 900 to perform adjusting step 430 by adjusting 431 first portion 238 of source table 230 with first portion 248 of target table 240 substantially in parallel to adjusting 432 second portion 239 of source table 220 with second portion 249 of target table 240.

The present invention is also summarized (cf. FIGS. 1-3) as computer system 999 for migrating content 232 from source table 230 in source database 210 to target table 240 in target database 220, wherein databases 210, 220 are physically different (e.g., computers 901, 902), wherein prior to migrating, business application 200 (e.g., on computer 900) consecutively sends 405 database instructions 201, (e.g., SQL statements) to source database 210, and wherein after migrating, business application 200 consecutively sends 406 database instructions 202 to target database 220. In either table 230, 240 each entry 231/232, 241/242 has unique key 231, 241; database instructions 201, 202 have action types 205 (e.g., D, I, R, U). Computer system 999 has migration tool 260 (e.g., implemented by CPP 100 running on processor 900) that comprises: means for storing (e.g., memory 920, cf. step 410) representations 254, 255 of action type 205 and of key 231 in log table 250 under the condition that action type 205 coincides with a predetermined action type (D, I, U); means for copying (e.g., network 990 with signals, cf. step 410) entries 231/232 of source table 220 to target table 240, wherein the coding of the entry is converted (e.g., from single-byte code to multi-byte code, ASCII to unicode); and means for adjusting (430, processor 910) the entries in target table 240 that have keys represented in log table 250, according to the action type representation stored in log table 250.

Preferably, processor 910 performs adjusting consecutively in a first adjustment period (e.g., T16 to T20) while application 200 is sending database instructions 201, and in a second adjustment period (e.g., T21 to T24) while application 200 is silent.

Preferably, processor 910 performs adjusting step 430 by adjusting 431 first portion 238 of source table 230 with first portion 248 of target table 240 substantially in parallel to adjusting 432 second portion 239 of source table 220 with second portion 249 of target table 240.

| Reference | Element |
|---|---|
| 100 | computer program product |
| 200 | business application |
| 201 | database instructions |
| 202 | database instructions |
| 210 | source database |
| 220 | target database |
| 230 | source table |
| 231 (1)(n)(6) | key |
| 231/232 | entries |
| 232 | content |
| 238, 248 | first portion |
| 239, 249 | second portion |
| 240 | target table |
| 241 (1)(n)(6) | key |
| 241/242 | entries |
| 242 | content |
| 250 | log table |
| 254 | key representation |
| 255 | action type representation |
| 260 | migration tool |
| 400 | method |
| 405, 406 | sending |
| 410 | storing |
| 420, 421, 422 | copying |
| 430, 431, 432 | adjusting |
| 499 | axis |
| 900, 901, 902 | computer |
| 910-980 | processor, memory, bus, input, output, interface, signal |
| 999 | computer system |

What is claimed is:

1. A method for migrating content from a source table in a source database to a target table in a target database, wherein the databases are physically different, the method comprising:

storing entries corresponding to database instructions in at least one of the source table and the target table, with a business application consecutively sending database instructions to the source database before migrating, the business application consecutively sending database instructions to the target database after migrating, each entry in each table having a unique key, and the database instructions having action types;

storing representations, for at least one entry in the source table, of an action type and of the unique key in a log table under a condition that the action type coincides with a predetermined action type;

copying entries of the source table to the target table;

removing representations from the log table of the entries copied from the source table to the target table;

adjusting the entries in the target table that have keys represented in the log table according to the action type representations stored in the log table; and removing representations from the log table of the entries adjusted in the target table, wherein copying the entries comprises converting a coding of each entry, and wherein adjusting the entries is performed in a first adjustment period while the business application is sending database instructions and in a second adjustment period while the business application is not sending database instructions.

2. The method of claim 1, wherein converting a coding of each entry comprises converting from a single-byte code to a multi-byte code.

3. The method of claim 2 wherein the single-Y byte code comprises ASCII-code and the multi-byte-code comprises unicode.

4. The method of claim 1 wherein the predetermined action type is selected from the group consisting of insert, delete, and update.

5. The method of claim 1 wherein the database instructions are SQL statements.

6. The method of claim 1 wherein adjusting the entries comprises adjusting a first portion of the source table with a first portion of the target table substantially in parallel with adjusting a second portion of the source table with a second portion of the target table.

7. The method of claim 1 wherein copying entries comprises copying a first portion of the source table to a first portion of the target table substantially in parallel with copying a second portion of the source table to a second portion of the target table.

8. An article of manufacture comprising a computer readable storage medium having computer readable program code embodied therein for executing instructions for migrating content from a source table in a source database to a target table in a target database, wherein the databases are physically different, the instructions adapted to cause a processor to perform operations comprising:

storing entries corresponding to database instructions in at least one of the source table and the target table, with a business application consecutively sending database instructions to the source database before migrating, the business application consecutively sending database instructions to the target database after migrating, each entry in each table having a unique key, and the database instructions having action types;

storing representations, for at least one entry in the source table, of an action type and of the unique key in a log table under a condition that the action type coincides with a predetermined action type;

copying entries of the source table to the target table;

removing representations from the log table of the entries copied from the source table to the target table;

adjusting the entries in the target table that have keys represented in the log table according to the action type representations stored in the log table; and removing representations from the log table of the entries adjusted in the target table, wherein copying the entries comprises converting a coding of each entry, and wherein adjusting the entries is performed in a first adjustment period while the business application is sending database instructions and in a second adjustment period while the business application is not sending database instructions.

9. The article of claim 8 wherein converting the coding of each entry comprises converting from a single-byte code to a multi-byte code.

10. The article of claim 9 wherein the single-byte code comprises ASCII-code and the multi-byte-code comprises unicode.

11. The article of claim 8 wherein the predetermined action type is selected from the group consisting of insert, delete, and update.

12. The article of claim 8 the database instructions are SQL statements.

13. The article of claim 8 wherein adjusting the entries comprises adjusting a first portion of the source table with a first portion of the target table substantially in parallel with adjusting a second portion of the source table with a second portion of the target table.

14. The article of claim 8 wherein copying entries comprises copying a first portion of the source table to a first portion of the target table substantially in parallel with copying a second portion of the source table to a second portion of the target table.

15. A computer program product embodied on a computer-readable storage medium for migrating content from a source table in a source database to a target table in a target database, wherein the databases are physically different, the computer program product having instructions adapted to cause a processor to perform operations comprising:

storing entries corresponding to database instructions in at least one of the source table and the target table, with a business application consecutively sending database instructions to the source database before migrating, the business application consecutively sending database instructions to the target database after migrating, each table having entries corresponding to database instructions, each entry in each table having a unique key, and the database instructions having action types;

storing representations, for at least one entry in the source table, of an action type and of the unique key in a log table under a condition that the action type coincides with a predetermined action type;

copying entries of the source table to the target table, wherein copying entries includes converting a coding of each entry;

removing representations from the log table of the entries copied from the source table to the target table;

adjusting the entries in the target table that have keys represented in the log table according to the action type representations stored in the log table; and removing representations from the log table of the entries adjusted in the target table, wherein the instructions cause the processor to perform adjusting consecutively in a first adjustment period while the business application is sending database instructions and in a second adjustment period while the business application is not sending database instructions.

16. The computer program product of claim 15 wherein the instructions cause the processor to perform adjusting by adjusting a first portion of the source table with a first portion of the target table substantially in parallel to adjusting a second portion of the source table with a second portion of the target table.

17. A computer system for migrating content from a source table in a source database to a target table in a target database, wherein the databases are physically different, the computer system having a migration tool comprising:

a computer-readable storage medium;

means for storing in the computer-readable storage medium entries corresponding to database instructions in at least one of the source table and the target table, with a business application consecutively sending database instructions to the source database before migrating, the business application consecutively sending database instructions to the target database after migrating, each entry in each table having a unique key, and the database instructions having action types;

means for storing in the computer-readable storage medium representations, for at least one entry in the source table, of an action type and of the unique key in a log table under a condition that the action type coincides with a predetermined action type;

means for copying entries of the source table to the target table, wherein copying entries includes converting a coding of each entry;

means for removing representations from the log table of the entries copied from the source table to the target table;

means for adjusting the entries in the target table that have keys represented in the log table according to the action type representations stored in the log table; and means for removing representations from the log table of the entries adjusted in the target table, wherein means for adjusting the entries in the target table further adjusts the entries in the target table in a first adjustment period while the business application is sending database instructions and in a second adjustment period while the business application is not sending database instructions.

* * * * *